(12) United States Patent
Nagesh et al.

(10) Patent No.: US 12,413,521 B1
(45) Date of Patent: Sep. 9, 2025

(54) SUBSCRIBER SHARDING ACROSS A BROADBAND NETWORK GATEWAY (BNG) CLUSTER USING A POLICY-DRIVEN LOAD BALANCER

(71) Applicant: Calix, Inc., San Jose, CA (US)

(72) Inventors: Anil Srirangapatna Nagesh, Bangalore (IN); Michael Rollins, Santa Rosa, CA (US); Morteza Ghodrat, Oak Park, CA (US); Nitin Gupta, Fremont, CA (US)

(73) Assignee: Calix, Inc., San Jose, CA (US)

( * ) Notice: Subject to any disclaimer, the term of this patent is extended or adjusted under 35 U.S.C. 154(b) by 0 days.

(21) Appl. No.: 18/394,317

(22) Filed: Dec. 22, 2023

(51) Int. Cl.
*H04L 47/122* (2022.01)
*H04L 43/0882* (2022.01)
*H04L 47/125* (2022.01)

(52) U.S. Cl.
CPC ........ H04L 47/122 (2013.01); H04L 43/0882 (2013.01); H04L 47/125 (2013.01)

(58) Field of Classification Search
None
See application file for complete search history.

(56) References Cited

U.S. PATENT DOCUMENTS

| | | | | |
|---|---|---|---|---|
| 9,723,069 B1* | 8/2017 | Fallows | ............... | H04L 67/1036 |
| 11,638,138 B2* | 4/2023 | Lee | ........................ | G06Q 50/10 370/254 |
| 2010/0080144 A1* | 4/2010 | Greenberg | .......... | H04L 12/1863 370/253 |
| 2012/0059934 A1* | 3/2012 | Rafiq | ................... | H04L 67/1008 709/225 |
| 2012/0155247 A1* | 6/2012 | Li | ........................... | H04L 45/22 370/220 |
| 2012/0170548 A1* | 7/2012 | Rajagopalan | ......... | H04W 28/10 370/331 |
| 2012/0230289 A1* | 9/2012 | Olsson | .............. | H04W 36/0011 370/329 |
| 2014/0269746 A1* | 9/2014 | Chinthalapati | ......... | H04L 45/50 370/409 |
| 2015/0146539 A1* | 5/2015 | Mehta | .................... | H04L 47/125 370/237 |
| 2018/0026814 A1* | 1/2018 | Poscher | .............. | H04L 12/2859 370/401 |
| 2018/0295062 A1* | 10/2018 | Bellessa | ................ | H04L 47/125 |
| 2021/0075682 A1* | 3/2021 | Alcorn | ................ | H04L 67/1021 |
| 2023/0308310 A1* | 9/2023 | Yabusaki | ................ | H04L 45/28 |

\* cited by examiner

*Primary Examiner* — Joshua Joo
(74) *Attorney, Agent, or Firm* — Staniford Tomita LLP (57) ABSTRACT

A central management component deployed in a cluster of broadband network gateways (BNGs) balances load among subscribers through the cluster by monitoring subscriber states comprising usage of the BNGs based on load parameters to detect an overload condition on any BNG. In the event of an overload condition, the component performs a horizontal sharding operation to move at least some access load from the overloaded BNG to an underutilized BNG. Sharding separates a large group of BNGs into smaller and more numerous BNGs by reassigns one or more subscribers among the gateways. A load balancer applies rules to re-direct traffic based on a defined load balancing rule using one of: preference, present load, proximity, and operating characteristic.

18 Claims, 5 Drawing Sheets

SUBSCRIBER SHARDING ACROSS A BROADBAND NETWORK GATEWAY (BNG) CLUSTER USING A POLICY-DRIVEN LOAD BALANCER

TECHNICAL FIELD

Embodiments are directed to broadband networks, and specifically to subscriber sharding across a consolidated broadband network gateway cluster.

BACKGROUND

Internet access is typically provided to homes and businesses through Internet Service Provider (ISP) or Broadband Service Provider (BSP) companies (collectively referred to herein as "BSPs") that offer high-speed communications interfaces through equipment such as cable modems and access to transmission lines (e.g., DSL, T1, Fiber, etc.). Broadband is the wide-bandwidth data transmission that transports multiple signals to provide high-speed Internet access.

A Broadband Network Gateway (BNG) is the access point for subscribers to connect their customer premises equipment to the broadband network and utilize the BSP/ISP services. A BNG generally establishes and manages subscriber sessions, aggregates traffic from multiple subscribers, and directs traffic to the service appropriate provider networks. Home and business subscribers typically access the Internet through a home router, or similar device, while a BNG is typically deployed by the service provider and comprises the first aggregation point, such as an edge router, in the network. Such a device handles tasks such as authentication, address assignment, security, policy management, quality of service, and so on.

Internet traffic has vastly grown from basic data transmission to disparate multimedia content distribution. Networks must now support transmission of many different types and volumes of data, such as graphics, voice (VOIP), on-demand video, real-time sensor data, and so on. Such usage places great burdens on existing BNG networks and equipment. Present service provider (vendor) BNG networks cannot be easily scaled to deal with increasing (or decreasing) numbers of subscribers, or significantly changing amounts of network traffic.

What is needed, therefore, is a BNG network management system that can seamlessly scale up and down to meet different capacity and bandwidth usage demands under ever-changing Internet usage patterns.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiments, it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. In this specification, these implementations, or any other form that the invention may take, may be referred to as techniques. In general, the order of the steps of disclosed processes may be altered within the scope of the described embodiments.

Embodiments are directed to systems and methods for seamlessly scaling (up or down) BNG network capacity and bandwidth to adapt to different access demands by subscribers using vendor services. In an embodiment, this is accomplished by breaking up a consolidated BNG (CBNG) network into multiple separate elements, and employing a manager component to arbitrate, schedule, and coordinate network traffic coming from different subscribers using certain hashing and sharding techniques.

Figure 1:
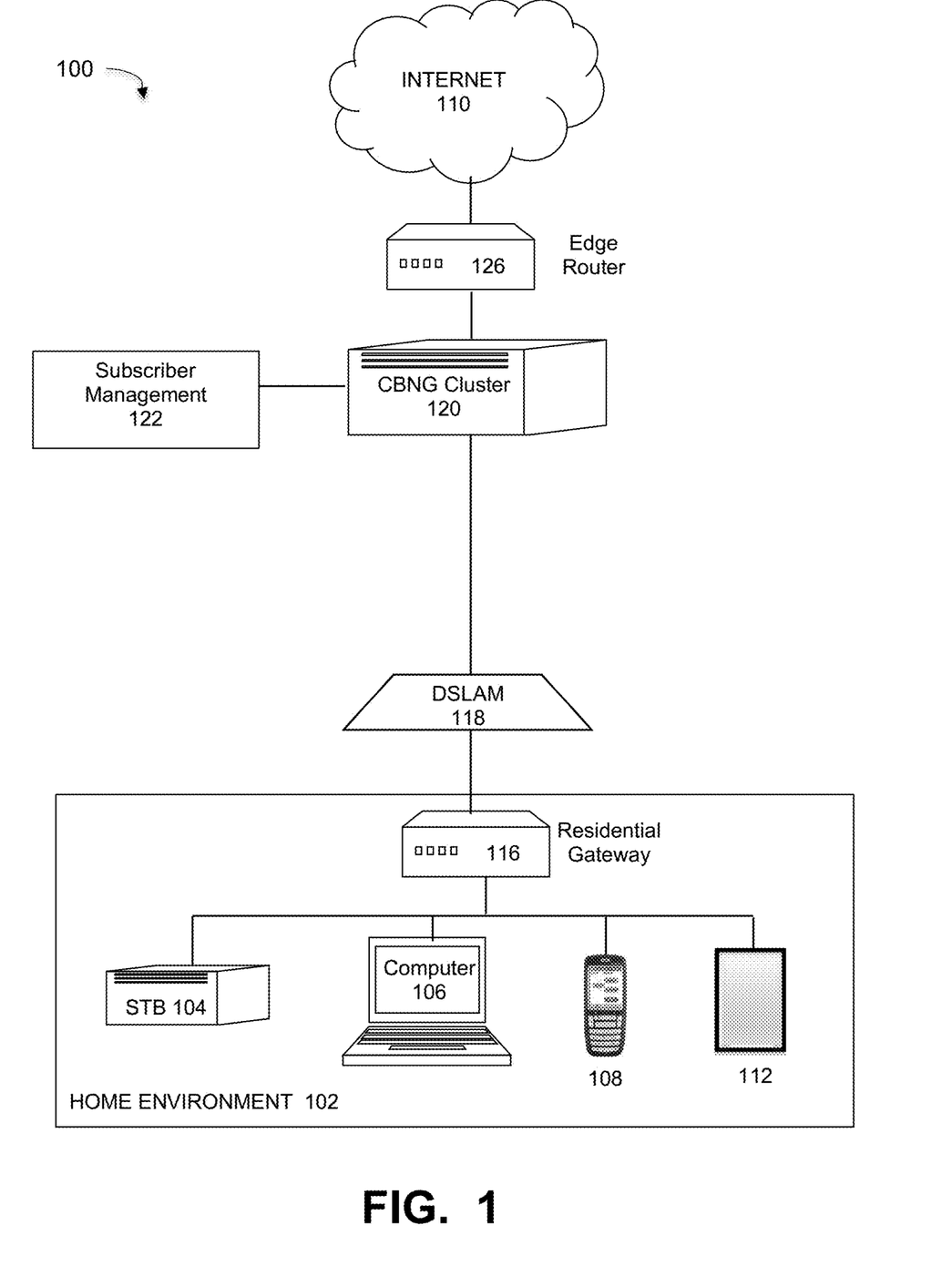
FIG. 1 illustrates a BNG-based network implementing a process for scaling subscribers, under some embodiments.

FIG. 1 illustrates a BNG-based network implementing a process for scaling subscribers, under some embodiments. As shown in FIG. 1, system 100 comprises home environment 102 that includes a number of computers 106 or "smart" devices that can be used to access the Internet, such as phones 108, tablets 112, and other similar devices. The home environment can also include one or more set top boxes (STB) 104 that enable a television to receive and decode digital television (DTV) broadcasts. A home gateway or router 116 provides access to the Internet 110 for through one or more intermediate devices or networks. The connection between the home devices and gateway 116 may be wireless links, wired links, or any combination thereof, and the wireless protocols may be implemented using IEEE 802.11, Bluetooth, or any other appropriate wireless standard.

The home environment 102 represents a subscriber that pays a fee to an ISP or BSP to access the Internet. Any number of subscribers/homes may be included in system 100 depending on ISP/BSP subscriber capacity. Environment 102 represents a "premises network" that may be installed in a home, small business, or other similar facility or residential environment.

In system 100, the residential gateway interfaces to external networks through a digital subscriber line access multiplexer (DSLAM), which is a network device often located in telephone exchanges, that connects multiple customer digital subscriber line interfaces to a high-speed digital communications channel using multiplexing techniques.

For the embodiment of system 100, home environment 102 accesses the Internet 110 through a Broadband Network Gateway cluster 120 that controls subscriber access to a range of services and applications, including Internet connectivity. Roles and requirements of the BNG are specified in Broadband Forum specification TR-101 and encompasses subscriber authentication, IP address allocation, bandwidth management and accounting. Other specifications include media definitions, such as aggregating copper and fiber-based wireline access to include fixed wireless access and enable hybrid access, making the BNG a widely accepted access platform for broadband providers.

In an embodiment, the BNG functionality is provided in the form of a Consolidated BNG (CBNG) element that provides full BNG functionality along with full routing suite on a single compact hardware switch. The CBNG 120 is part of a network that accesses the Internet through an edge router 126, which is a specialized router located at a network boundary that enables the home environment 102 to ultimately connect to the external Internet network 110. For purposes of description, the terms BNG and CBNG may be used interchangeably, except where otherwise noted.

For the embodiment of FIG. 1, the CBNG devices are provided as a cluster 120 of multiple BNG gateways. These gateways multiply the capacity of system 100 with respect to the number of subscribers that can simultaneously access the Internet. When multiple gateways are provided, there must be a way to accommodate scaling the network in terms of number of subscribers and/or network capacity available to each subscriber.

As used in FIG. 1 and described herein, a BNG node device is a single networking switching device that hosts a BNG control plane function. A BNG node device logically has two interfaces. The first is a network core facing interface, the second is a subscriber facing interface. Core facing interfaces are connected to core routers. Subscriber facing interfaces are logically connected to the BNG by a combination of home (residential) gateway devices where the home gateway device is itself connected to an Optical Line Terminals (OLTs) where the OLT is directly connected to the BNG device. A home gateway device may itself be considered to be a subscriber device. A subscriber endpoint must always have a primary BNG owner node. Other BNG nodes act as the backup host for specific subscribers.

A BNG is an essential network element that controls subscriber access to a range of services and applications, including the internet. BNG roles and requirements were introduced in Broadband Forum specification TR-101 that encompass subscriber authentication, IP address allocation, bandwidth management and accounting. Subsequent specifications have expanded its scope and functionality from aggregating copper and fiber-based wireline access to include fixed wireless access and enable hybrid access, making the BNG an increasingly capable, versatile, and strategic platform for broadband providers.

A Consolidated BNG (CBNG) is a specific type of BNG that provides full BNG functionality along with full routing suite on a single compact hardware switch. Another specific type of BNG is a Multi-Service BNG (MS-BNG), which extends the capabilities of a traditional BNG to offer services to both residential and business customers as well as to allow mobile backhaul deployments. To achieve this, it performs Ethernet aggregation and can either forward packets via MPLS or through IP aggregation/routing. Yet another type of BNG is a disaggregated Broadband Network Gateway (DBNG) that separates the control plane and user plane in the DBNG to enable more efficient use of resources and simplify operations.

A BNG cluster is a logical grouping or a logical set of BNG nodes that are logically connected in either a full mesh or star topology. BNG devices may be dynamically added and removed in real time from an operating BNG cluster using a coordination mechanism. The mechanism for adding or removing a BNG node from a BNG cluster and advertising the BNG cluster change to load balancer devices is a manually triggered update that must be done locally to the load balancer in order to ensure correct path security to/from the cluster and end subscribers/subscriber devices.

A BNG Load Overwatch Function (BLOF) is an overwatch function that dynamically monitors per BNG node's overall load so as to calculate and track a deterministic and fair policy for the overall BNG cluster in terms of subscriber load per BNG Node in the cluster.

There are two broad approaches for scaling in conventional systems: vertical scaling and horizontal scaling. Vertical scaling, also known as scaling up, involves adding more power (CPU, RAM, disk, hardware capacity, etc.) to an existing machine. A more powerful CBNG could terminate much higher number of subscribers and route more traffic between a core and subscriber network. However, vertical scaling comes with some serious drawbacks, such as practical hardware limits, high cost, and a greater risk of single point of failures, among others.

Horizontal scaling, also known as sharding, is the practice of adding more CBNG devices to a cluster (e.g., 120). Sharding separates a large subscriber base into smaller, more easily managed parts called shards. Each shard shares the same schema, profiles and configurations, though the actual subscribers on each shard is unique to the shard. Although sharding is an effective technique to scale the subscribers, it does introduce complexities and new challenges to the solution. For example, resharding data is needed when a single shard can no longer hold more data due to rapid growth, or the fact that certain shards might experience shard exhaustion faster than others due to uneven data distribution. When shard exhaustion happens, updating the sharding function and moving data around is required. Consistent hashing is a commonly used technique to solve this problem. Furthermore, to ensure high availability and reliability, subscriber states must be replicated asynchronously over the number of CBNG nodes, where this number is a configurable/dynamic parameter.

Embodiments of system 100 includes a subscriber management component 122 that provides improved horizontal scaling of CBNG devices, under some embodiments. In an embodiment, component 122 uses consistent hashing and sharding techniques together to distribute data across a distributed system.

Consistent hashing is a way of distributing dataplane flows across a cluster of nodes such that when a node is added or removed from the cluster, the number of keys that need to be remapped is minimized. In consistent hashing, a hash function is used to map each key to a node in the cluster. When a node is added or removed, only the keys that were mapped to that node need to be remapped to a different node.

Sharding is a method of distributing data across a cluster of nodes such that each node is responsible for a specific subset of the data. The data is typically divided into smaller chunks called shards, and each shard is stored on a different node. When a new node is added to the cluster, the data is divided into more shards and distributed among the nodes. This can be done by using a range-based or a mod-based sharding strategy.

In summary, consistent hashing is mainly used to minimize the remapping of keys when a node is added or removed, while sharding is mainly used to distribute the data evenly across a cluster of nodes. Sharding also includes the concept of resharding of data and is used when a single shard can no longer hold more data due to rapid growth, or when certain shards might experience shard exhaustion faster than others due to uneven data distribution, and which requires updating the sharding function and moving subscriber sessions to a different BNG element in the BNG cluster. Thus, consistent hashing is mainly used to minimize the remapping of keys when a node is added or removed, while sharding is mainly used to distribute the data evenly across a cluster of nodes.

Figure 2:
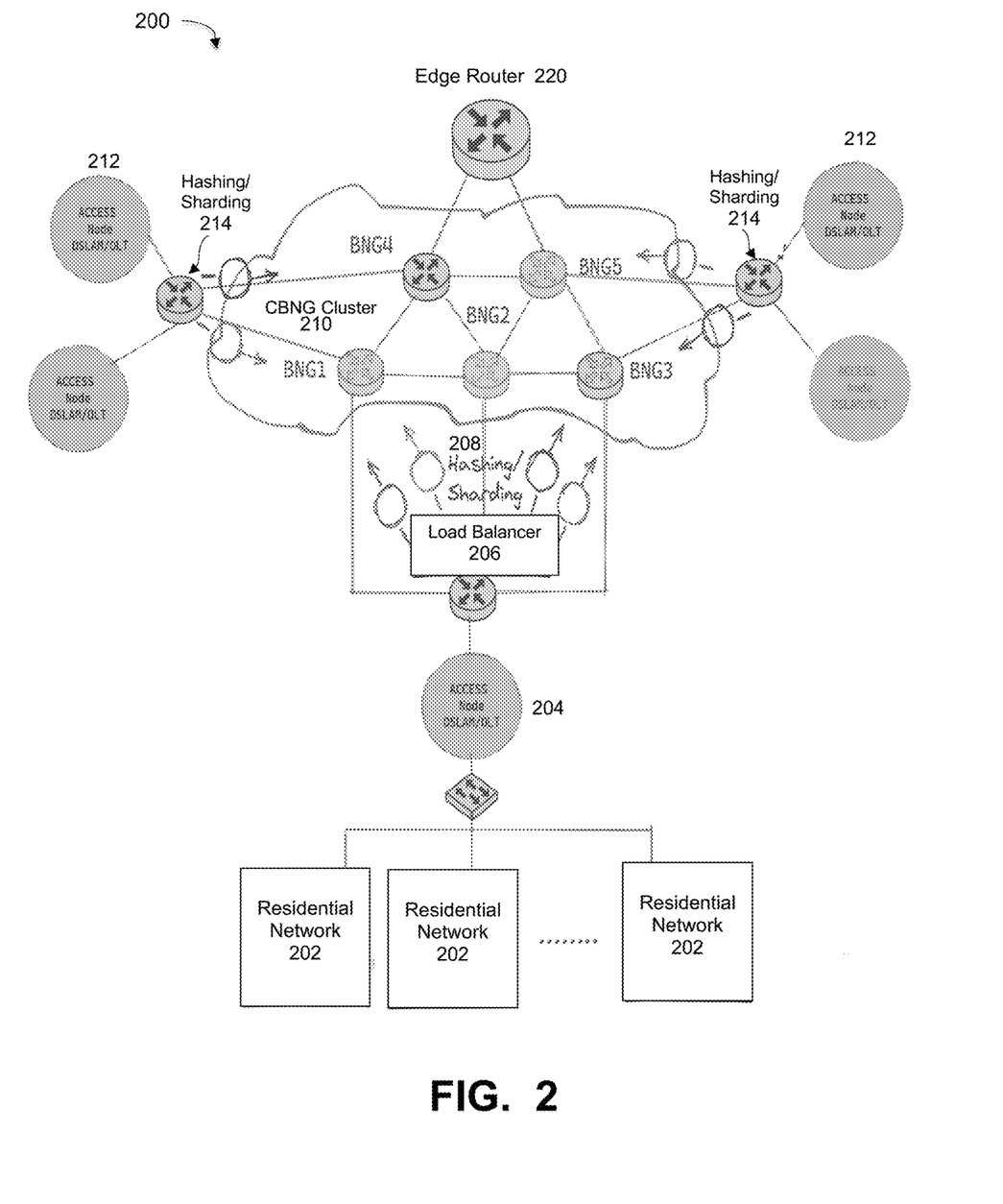
FIG. 2 illustrates a BNG network including a management component that uses consistent hashing and sharding techniques to distribute data across the BNG gateways, under some embodiments.

FIG. 2 illustrates a BNG network including a management component that uses consistent hashing and sharding techniques to distribute data across the BNG gateways, under some embodiments. As shown in FIG. 2, system 200 includes a number of individual residential (home or business) networks 202 accessing the Internet through an access node 204 providing DSLAM functions to access an intermediate network having an edge router 220. This network includes a CBNG cluster 210 having a number of BNG gateway devices denoted BNG1 to BNG5, though any number (N) are possible and may be individually denoted BNGn.

The access node 204 may support any practical number of home/business networks 202, each of which may utilize any of the BNGs in cluster 210. For the embodiment of FIG. 1, system 100 includes a management component 204 that performs certain proxy/load balancing functions to synchronize BNG subscriber states and sessions among the BNG nodes to balance access loads and support scaling of the gateway network.

The management component 208 provides a reliable way of synchronizing BNG subscriber state/sessions between the multiple BNG nodes 1-$n$ in cluster 210, to provide redundance and load balancing in Internet access to subscribers 202. In an embodiment, this is implemented through an extension to an existing routing protocol, in which any appropriate routing protocol may be used, depending on the choice of the implementor or system administrator.

In an embodiment, system 200 includes a load balancer to shard and hash BNG subscriber information across a BNG cluster. The load balancer executes an intelligent algorithm to manage the shard/hash algorithm and a feedback loop between the BNG cluster and the load balancer.

As shown in FIG. 2, the management component implements load balancer device 206 between the subscriber 202 and CBNG cluster 210 to ensure L2 flow based sharding. For example, all the data packets associated with "Source Mac address, S Vlan & C Vlan, Option 82" combination are sharded to a specific CBNG. The actual choice of CBNG here is user configurable. Here, 'L2' refers to OSI (Open Systems Interconnection) layer 2, and load balancing can distribute traffic among the machines on the same network, but only routes traffic based on MAC addresses.

Packet sharding helps in scalability and geo-distribution by horizontally partitioning subscribers across multiple CBNGs.

Consistent hash sharding and range sharding and other logics can be incorporated for intelligent/smart distribution of subscribers.

Figure 3:
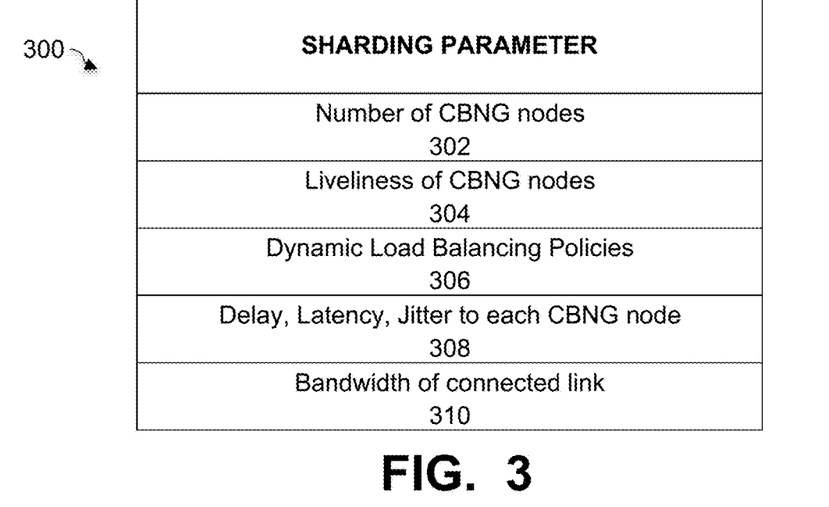
FIG. 3 is a table illustrating example parameters for performing sharding, under some embodiments.

Certain parameters can be used to perform the sharding operation. FIG. 3 is a table 300 illustrating example parameters for performing sharding, under some embodiments. As shown in FIG. 3, these parameters include: number of CBNG nodes in the cluster 302, liveliness of CBNG Nodes in the cluster (connectivity or reachability to the CBNG's GW IP address) 304, dynamic load balancing policies pushed by NMS or configured locally (e.g., exclude CBNG node list, include CBNG node list, relative percentage of load for each CBNG node) 306, signal quality (e.g., delay, latency, and jitter) to each CBNG node (which can help in choosing geographically nearest CBNG nodes in the cluster) 308, bandwidth of a connected link to the CBNG node 310, and other similar parameters.

Figure 4:
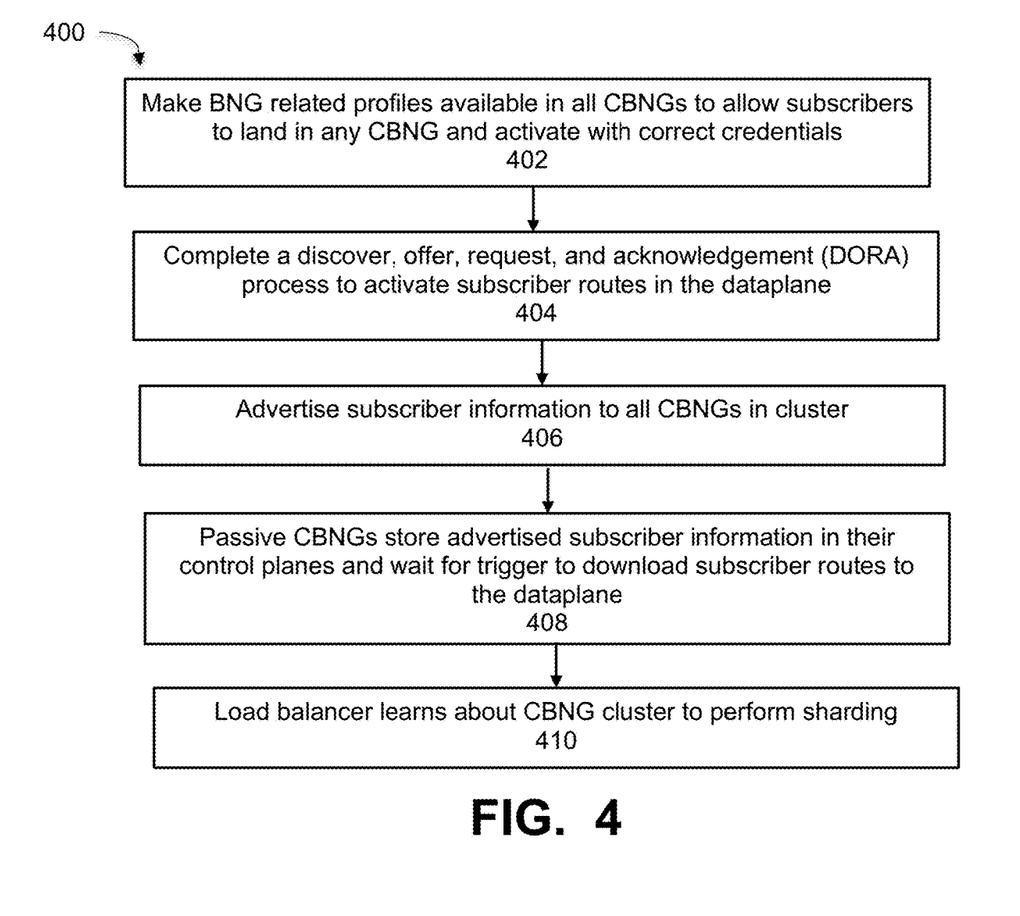
FIG. 4 is a flowchart that illustrates a method of performing load balancing in a BNG cluster using sharding/hashing, under some embodiments.

FIG. 4 is a flowchart that illustrates a method of performing load balancing in a CBNG cluster using sharding/hashing, under some embodiments. For process 400, all DHCP (dynamic host configuration protocol) pools, quality of service (QOS) profiles and BNG related profiles information must be available in all CBNGs so that any subscriber can land in any CBNG and can be activated/deactivated with correct credentials, 402.

In step 404, the process performs a Discover, Offer, Request, Acknowledgement (DORA) cycle to dynamically learn, activate, and deactivate subscriber routes in the data plane. After this step is completed (such as through IP over Ethernet, IPOE or PPPoE) and the subscriber is successfully activated, the active CBNG's subscriber manager in the CBNG cluster advertises the subscriber information to all the CBNGs in the cluster, 406. Advertisement is real-time and unsolicited through any appropriate protocol, 406.

The passive (non-active) CBNGs learn this information and maintain this information in their control planes, and wait for a trigger to download subscriber routes to the data plane, 408. In an embodiment, these triggers include any one of:

1) Unknown Upstream/Downstream traffic hits their system and matches one of a learnt subscriber's route information.
2) a system message is received and matches one of the learnt subscribers route information.
3) NMS notifies the system to activate the route for specific subscribers.

In step 410 of process 400, the load balancer learns about CBNG cluster. For this step, the load balancer should be fully aware and number of available CBNGs in the cluster and the liveliness/health of each CBNG. The load balancer should incorporate link and device liveliness of each CBNGs. For this, it can actively probe each CBNGs in the cluster and/or passively monitor the traffic received from a CBNG to declare it liveliness. The load balancer should also be made aware of the available bandwidth left in each CBNG so that this can be considered for the sharding operation.

As described above, existing legacy BNG devices can be configured to work together to scale the system out horizontally to handle more subscribers than any individual BNG node could handle alone. To scale out effectively, it is necessary to balance the load of the subscribers across a BNG device pool, such as through a load balancer device that fronts the BNG device pool. In an embodiment, load balancing to share the subscribers across the BNG devices in the pool is done in a deterministic manner that is based on policies that can be sourced in two ways. The first mechanism is that the load balance policy is local to the load balancer, and the second mechanism is that the load balancer policy is learned from external server entities.

The load balancer redirects traffic (control packets and data packets) to an appropriate BNG node as its primary function. The decision as to which BNG node traffic a given subscriber and subscriber flow is to be directed is deterministic and driven by load balancer instantiated policy. Similarly, the decision to re-route subscriber flows to backup/secondary BNG nodes present in the BNG cluster is also deterministic in behavior and is dictated by load balancer instantiated policy.

Figure 5:
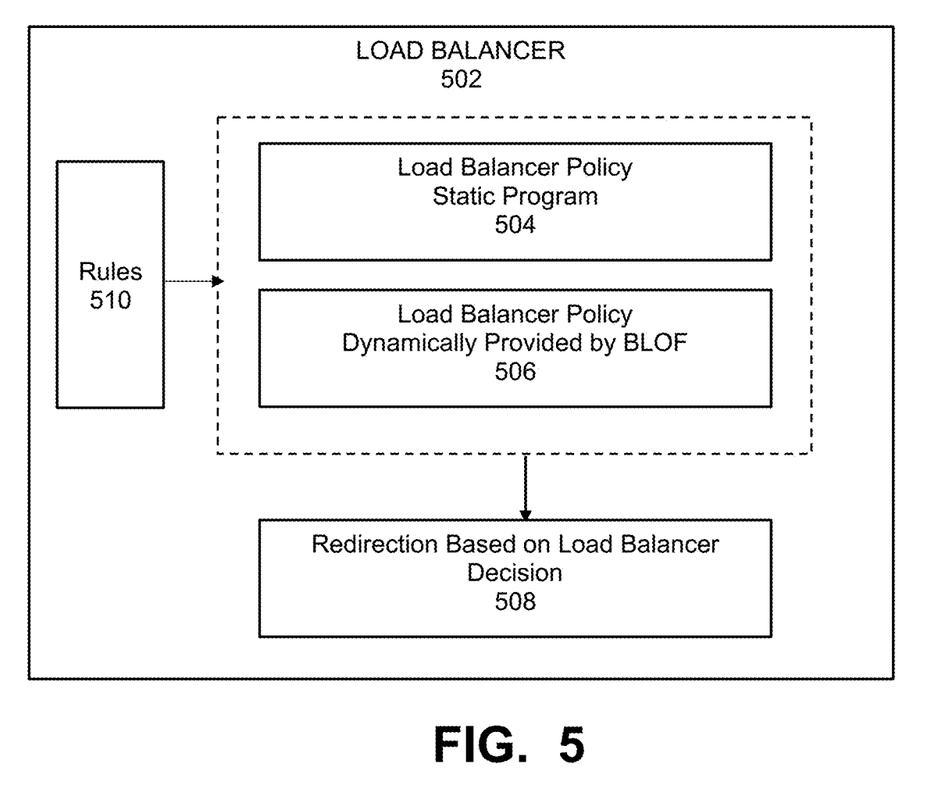
FIG. 5 illustrates the main functional components of a load balancer, under some embodiments.

FIG. 5 illustrates the main functional components of a load balancer, under some embodiments. As shown in FIG. 5, load balancer 502 applies a policy 504 or 506 to make a decision 508 as to redirection among BNG devices.

The load balancer policy has two ways which is learned by the load balancer. In the first use case 504, the load balancer policy is statically programmed into the load balancer device. Determinations as to which subscriber forwarded to which BNG node is made local to the load balancer device.

In the second use case 506, the load balance policy is applied to the load balancer dynamically by the BNG Load Overwatch Function (BLOF) that is present in the BNG cluster. This overwatch function dynamically monitors a BNG node's overall load so as to calculate and track a deterministic and fair policy for the overall BNG cluster in terms of subscriber load per BNG node in the cluster.

The load balancer has two modes of operations for receiving periodic updates on the BLOF. In the first case, it requests basic policy whenever a network event between the load balancer and the BNG cluster is observed (event drive). In the second case, the load balancer requests policy updates from the BLOF function on a periodic basis and then applies any changes to the received policy to the load balancer.

It is the responsibility of the BLOF function to provide a policy to load balancer and to update BNG nodes in order to provide symmetric fair and distributed traffic flows through BNG node. The load balancer function uses a make-before-break concept while migrating a subscriber from one BNG node to another BNG node.

With respect to load balancing within the cluster, since each BNG cluster contains a number (n) of BNG nodes, there is a possibility of load balancing within the cluster such that the upstream and downstream traffic of subscribers are distributed across all the nodes, thus preventing any single node getting overwhelmed. If any BNG node fails, the load balancer will shift the subscribers owned by that BNG node (their upstream and downstream traffic) to another BNG node as dictated by current load balancer policy. The load balancer will also log the shift events and raise appropriate alarms.

To effectively load balance the subscriber across different BNG nodes within a BNG cluster or across different BNG cluster, a load balancer has physical or logical (tunneled) connections to appropriate BNG node devices. The load balancer can only distribute subscribers it hosts to those BNG devices that have physical or logical (tunneled) connections with the load balancer.

The BLOF function in case of manual policy updating understands the scope of load balancing list for each load balancer in the network.

The load balancer is capable of load balancing within a BNG cluster, as well as across different BNG clusters. Balancing choices with and across BNG clusters are dictated by the current instantiated load balancer policy.

Load balancers are generally not capable enough of making any decision on their own and require a configured load balancer policy. Load balancer policy is composed of a set of rules/preferences 510. The set of load balancer policy rules guides the load balancer in how it distributes subscribers (and their traffic across nodes in clusters). The load balancer gets its the policy from external BLOF, as mentioned above and shown as 506. Alternatively load balancer can be directly configured locally in the load balancer by the operator, as shown as 504.

There are two models of load balancing policies used to update the load balancer. The first is a push policy (PUSH) in which the BLOF will push the policy to the Load balancers. The second is a Pull policy (PULL) in which the load balancer will pull policy from the BLOF upon recognizing a new subscriber upstream or downstream traffic as identified by MAC, VLAN, circuit IDs, etc. The load balancer will pull the information and then according to the newly updated policy, traffic from the subscriber will be directed or re-directed to the appropriate BNG node.

Figure 6:
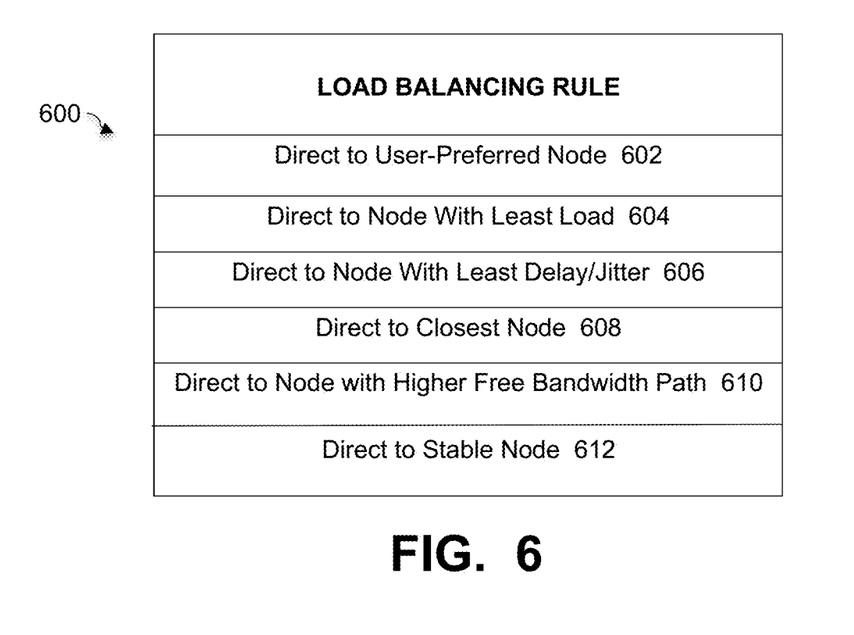
FIG. 6 is a table that lists rules for a load balancer policy, under an example embodiment.

The load balancer policy is based on a number of possible rules 510 depending on preference, load levels, performance, topography, and other similar parameters. FIG. 6 is a table that lists rules for a load balancer policy, under an example embodiment.

As shown in table 600 of FIG. 6, the following rules are possible. The first preference is to direct traffic to the BNG node to which the operator wants traffic to be landed, 602. The second preference is to direct to the BNG node having the least load, 604. The third preference is to direct traffic to the BNG node having the least delay, jitter and better throughput, or other link/network parameters, 606. The fourth preference is to direct to the BNG node that is closes or closer, 608. The fifth preference is to direct to the BNG node with which the network path has a higher free bandwidth, 610. The sixth preference is to direct to the BNG node which is stable or most stable, 612.

The rules may be applied in a particular order in which a first preference is tried followed by other preferences in a defined order, such as that shown in FIG. 6, for example, or they may be applied in a ransom order. FIG. 6 illustrates only some example of possible rules and order of preference, and any other rules or order is also possible.

In some cases of node failure, the operator may be given a command to remove a BNG node from the BNG cluster by force. This is useful in the case of which the BNG is compromised, or is otherwise not responsive to external control. In this situation, all subscribers served by that BNG are restarted. Upon the restart subscribers previously hosted by the removed BNG node will be assigned to the remaining BNGs in that cluster as dictated by BNG and load balancer policy.

For a redirection however, once a policy is applied, the load balancer causes the redirection of traffic from one node to another as shown by function 508. In an embodiment, the load balancer activates/migrates a subscriber to a BNG node based on the current load balancer policy by using a make-before-break strategy.

Figure 7:
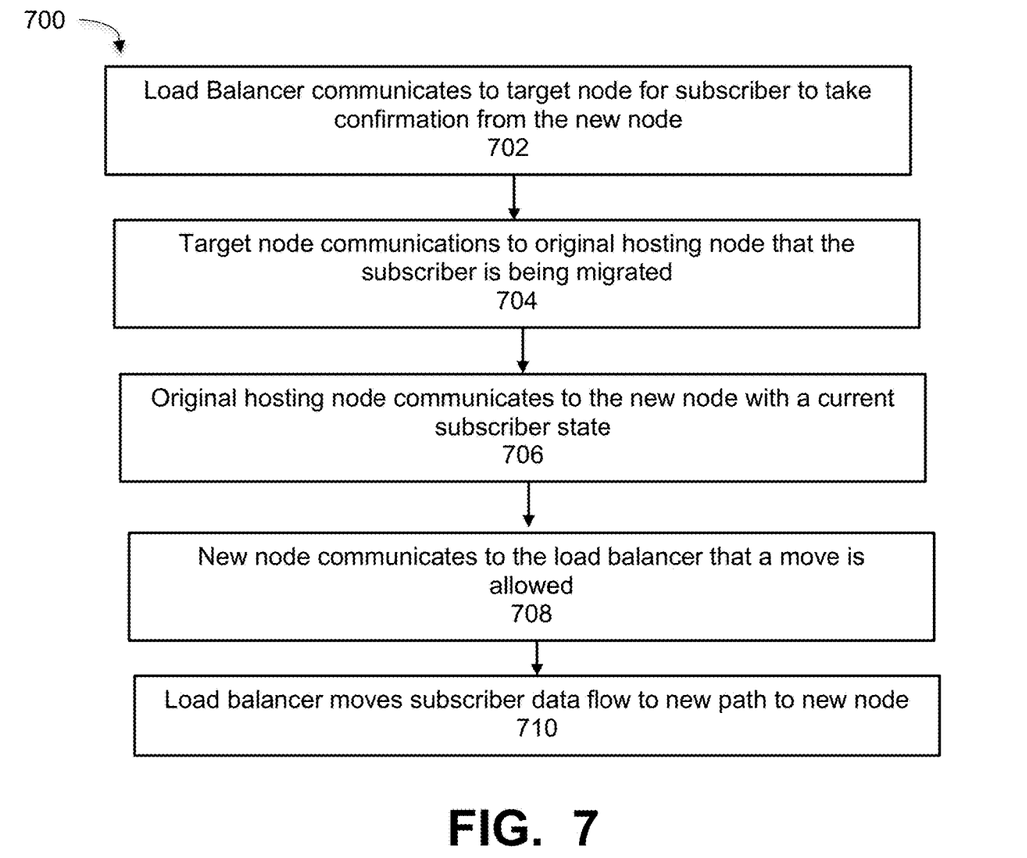
FIG. 7 is a flowchart that illustrates a method of redirecting network traffic after applying a policy, under some embodiments.

FIG. 7 is a flowchart that illustrates a method of redirecting network traffic after applying a policy, under some embodiments. Process 700 illustrates a series of communications among the load balancer, the hosting BNG, the old (target) node that is to be redirected from, and the new node that is to be redirected to. Prior to executing the migration, the load balancer communicates to the target BNG node for the subscriber to take confirmation from the new BNG node, 702. The target BNG node communicates to the original hosting BNG node that the subscriber is being migrated, 704. The original hosting BNG communicates to the new BNG node with a current subscriber state, 706. The new BNG node communicates to the load balancer that the move is allowed, 708. At this point, the load balancer moves the subscriber flow to the new path, 710.

In an embodiment, the consent of BNG nodes for migration is a prerequisite the migration process illustrated in FIG. 7. If a BNG node in the cluster is forced out of the cluster by the operator or is otherwise unavailable to the new BNG, the new BNG can autonomously inform the load balancer to allow the move. In this case the BNG restarts the subscriber session.

Even though a policy may dictate migration, and consent is not acknowledged by BNG node to accept the migration, the load balancer has to wait until the old (target) and new BNG nodes agree for new subscriber activation or migration, unless the old is down or not present With reference back to FIG. 2, once the sharding process has subdivided BNGs into shards, a hash function is used to appropriately map keys to BNGs in the re-organized cluster. In an embodiment, a consistent hash function is used to map each key so that only the keys that were mapped to an original sharded node need to be remapped to a different node.

In an embodiment, component 208 includes a smart switch with BNG subscriber sharing and control/data packets load balancer functionality. This component provides system 200 with knowledge of each node in the cluster as an end point for handling/terminating subscriber, and understanding each subscriber control packet flows of IPOE/PPPoE protocol and their respective data traffic. The component performs independent sharding of subscribers to a specific node across BNG cluster.

The system 200 delegates load balancing decisions to component 208 and receives feedback for sharding subscribers to a specific node across BNG cluster. It can assign a new node when a current node failure condition is detected, such as link to current node is down, current node is overloaded, or current node goes into maintenance, etc.

The external controller 208 monitors each node in the BNG cluster 210 for their maximum threshold capacity to handle subscriber and current subscribers it is handling. It monitors the smart switches and any current BNG control and data flows mapping to specific nodes in the cluster. The smart switch can be updated so as to assign a node to a specific node or to migrate to a new node from the current node.

Embodiments of the horizontal sharding process provided by management component 208 help avoid hard resource limits dictated by the system hardware. They provide dynamic learning of subscriber routes in the data plane and synchronize policy application to cluster profiles. They also allow for isolation of a CBNG node in the cluster for maintenance.

A dynamic make before break nature of the solution helps to migrate all subscriber traffic from overloaded CBNG node to a healthy CBNG node in the cluster, and synchronizes subscriber state across BNG nodes in the cluster, and also to NMS if it is interested through routing protocols (e.g., IGP or BGP). Embodiments also provide dynamic subscriber route activation/de-activation policies when a subscriber is migrated to a different CBNG, and dynamic CBNG node registration to the cluster and proactively learning of states to facilitate load shifts among the CBNG nodes.

Sharding of subscriber data involves data synchronization between BNG network elements. To achieve synchronization of BNG subscriber sessions between the redundant BNG nodes, data elements are sharded using the following technologies: 1) using new IGP Opaque TLV extension, 2) using New BGP NLRI extension, 3) using new VRRP packet type, or 4) using a proprietary protocol for syncing between nodes.

The L2 load balancer device 206 between the subscriber and BNG ensure L2 flow based sharding. For instance, all the packets associated with "Source Mac address, S VLAN & C VLAN, Option 82" combination are sharded to a specific BNG. This is a programmable parameter that is left to an operator to select.

Packet sharding helps in scalability and geo-distribution by horizontally partitioning subscribed across multiple BNGs. Consistent hash sharding and range sharding and other logic can be incorporated for intelligent/smart distribution to subscribers.

A number of parameters may be set by the end user to affect the Sharding distribution, as shown in FIG. 3.

All DHCP pools, QOS profiles and BNG related profiles information should be made available in all BNGs. This can be ensured by manual configuration or by means of NMS, so that any subscriber can land in any BNG and can be activated/deactivated with correct credentials.

Embodiments include dynamic subscriber's learning, and activating/deactivating subscriber routes in the dataplane. After every DORA process is completed through IPOE or PPPoE and subscriber is successfully activated the active BNG's, the subscriber manager in the BNG cluster advertises the subscriber information to all the BNGs in the cluster. Advertisement is performed in real time and unsolicited through a defined protocol. The passive BNG nodes learn this information and maintain this information in their respective control planes.

The passive BNG nodes wait for certain triggers to download subscriber routes to the dataplane. The triggers can comprise: 1) unknown upstream/downstream traffic hitting their system and matching one of these learnt subscribers route information; 2) receiving ARP/ND messages that match one of these learnt subscribers route information; or 3) an NMS notification to activate the route for specific subscribers.

Embodiments thus provide an L2 load balancer device learning about BNG cluster, where it is fully aware and number of available BNGs in the cluster and its liveliness/ health. The load balancer incorporates link and device liveliness of each BNGs, and can actively probe each BNG in the cluster and/or passively monitor the traffic received from BNG to declare it live. The load balancer should also be made aware of available bandwidth left in each BNG so that this can be considered while sharding.

BNG nodes in the cluster can be isolated for maintenance. This is useful for bringing up a sample subscriber on the isolated BNG node before setting the BNG in service.

Embodiments improve present methods, such as vertical BNG subscriber scaling, which is bound by resource availability in hardware. Hard resource limits are dictated by host CPU, memory and switch chipsets present in the BNG device. To solve this scaling issue, embodiments provide horizontally scale-out instead of scaling up vertically in a single BNG hardware instance. A dynamic make-before-break solution helps to migrate all subscriber traffic from an overloaded (old) BNG node to a healthy (new) BNG node in the cluster. It also provides on-the-fly subscriber route activation policy when subscriber is migrated to different BNG node, and on-the-fly addition and deletion BNG nodes.

As shown in FIG. 2, CBNG cluster 210 comprises several BNG gateways. In an embodiment, these clusters can be separates into sub-clusters or combined into super-clusters, as needed. Each gateway in a BNG cluster is monitored with respect to scale, performance, bandwidth utilization, memory utilizations, system failures, and so on, to identify degrading devices or anticipated BNG node failures. If any such condition is detected, the system can report to an administrator to take appropriate action. For example, in the case of a cloud-native BNG, new virtual BNG node could be dynamically spawned.

Nodes within the same cluster or from different clusters are capable of handling subscribers moved to form a node which is going for maintenance or dynamic upgrades.

The system keeps a set of nodes within the same cluster or across cluster in sync with subscribers information so that other nodes can act as candidates for backup.

Embodiments have been described with reference to BNG and CBNG devices and systems, but embodiments are not so limited. Other subscriber gateway systems can also be used, such as Disaggregated Broadband Network Gateway (DBNG) devices, which separate the control plane and user plane in the DBNG to enable more efficient use of resources and simplifies operations, or Multi-Service BNG (MS-BNG), which extends the capabilities of a traditional BNG to offer services to both residential and business customers as well as to allow mobile backhaul deployments.

Embodiments thus described effectively increase dataflow distribution across a BNG cluster through horizontal scaling by employing sharding a load balancer network element that fronts n BNG network elements. Sharding is used to distribute BNG subscriber instances and associated data across a number of multiple BNG network elements. Sharding separates large subscriber base into smaller, more easily managed parts called shards. Each shard shares the same schema, profiles and configurations, although for a given subscriber, each shard is unique to the subscriber instance. Hashing is used to steer the subscriber sessions towards the BNG instances upon subscriber session initiation as dictated by the dynamic load balancer that fronts the BNG devices.

As described above, in an embodiment, system 100 includes a BNG processing component that may be implemented as a computer implemented software process, or as a hardware component, or both in a computing device such as component 122 in FIG. 1. As such, it may be an executable module executed by the one or more computers in the network, or it may be embodied as a hardware component or circuit provided in the system. The network environment of FIG. 1 may comprise any number of components coupled over the Internet or similar large-scale network or portion thereof. Each node in the network(s) comprises a computing device capable of executing software code to perform the processing steps described herein.

Such a device may include a processor, memory, interfaces, high-speed expansion ports, and interconnected busses. The processor can process instructions for execution within the computing device, including instructions stored in the memory or on a storage device to display graphical information for a (graphical user interface) GUI on an external input/output (I/O) device, such as a display coupled to high speed interface. In other implementations, multiple processors and/or multiple busses may be used, as appropriate, along with multiple memories and types of memory.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. In an embodiment, an ASIC design can be used to implement system algorithms as well as hardware accelerated designs for specific use cases.

These computer programs (also known as programs, software, software applications or code) can include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/ or data to a programmable processor, including a machine-readable medium that receives machine instructions as a machine-readable signal. The term "machine-readable signal" refers to any signal used to provide machine instructions and/or data to a programmable processor.

The present disclosure, in various embodiments, includes components, methods, processes, systems and/or apparatus substantially as depicted and described herein, including various embodiments, subcombinations, and subsets thereof. Those of ordinary skill in the art will understand how to make and use the present disclosure after understanding the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of balancing load among subscribers accessing the Internet through a cluster of gateway devices, comprising:
    monitoring subscriber states comprising usage of the gateway devices based on one or more parameters;
    determining a load on each gateway device of the gateway devices to detect an overload condition;
    performing, in the event of an overload condition on a first gateway device and by a central management component in the cluster, a sharding operation to move at least some access load from the first gateway device to a second gateway device having spare access capacity;
    performing, by a central management component, a discover, offer, request, acknowledgement (DORA) process to determine the state of each subscriber of the subscribers;
    activating a node upon completion of the DORA process as an active node; and
    advertising subscriber information of the active node to all non-active nodes in the cluster.

2. The method of claim 1 wherein the one or more parameters comprise at least one of: number of gateway devices in the cluster, liveliness of the each gateway device, defined load balancing policies, signal quality to the each gateway device, and bandwidth of a connected link to a gateway device.

3. The method of claim 1 wherein the sharding operation comprises a horizontal sharding operation effectively separating a group of gateway devices into smaller and more numerous gateway devices, and further wherein the sharding operation reassigns one or more subscribers from the first gateway device to the second gateway device.

4. The method of claim 3 wherein the horizontal sharding operation reassigns based on a defined load balancing rule using one of: preference, present load, proximity, and operating characteristic.

5. The method of claim 3 further comprising performing a consistent hash function to map a key for the each gateway device so that only the keys that were mapped to the first gateway device need to be remapped to the second gateway device.

6. The method of claim 3 further comprising determining if the sharding operation relieved the overload condition on the first gateway device, and if not, performing a re-sharding operation to move at least some additional access load from the first gateway device to the second gateway device or a third gateway device.

7. A method of balancing load among subscribers accessing the Internet through a cluster of gateway nodes, comprising:
    deploying a central management component in the cluster;
    learning, by the central management component, a state of each subscriber of the subscribers accessing the Internet;
    monitoring a load condition of each node of the cluster of gateway nodes based on one or more parameters to detect an overload condition of any node;
    first shifting, in the event of detection of the overload condition, a subscriber load from an overloaded node to an underutilized node;
    monitoring the overloaded node to detect any further overload condition;
    second shifting, in the event of the further overload condition, additional subscriber load to the underutilized node;
    performing, by the central management component, a discover, offer, request, acknowledgement (DORA) process to determine the state of each subscriber of the subscribers;
    activating a node upon completion of the DORA process as an active node; and
    advertising subscriber information of the active node to all non-active nodes in the cluster.

8. The method of claim 7 wherein the shifting comprises a horizontal sharding operation effectively separating a group of nodes into smaller and more numerous nodes.

9. The method of claim 8 wherein the each node comprises a consolidated broadband network gateway (CNBG) deployed for use by a broadband service provider (BSP).

10. The method of claim 9 wherein the horizontal sharding operation reassigns one or more subscribers from a first gateway device to a second gateway device, based on a defined load balancing rule using one of: preference, present load, proximity, and operating characteristic.

11. The method of claim 10 further comprising performing a consistent hash function to map a key for the each node so that only keys that were mapped to the overloaded node need to be remapped to the underutilized node.

12. The method of claim 7 wherein each of the non-active node downloads a subscriber route for the active node upon occurrence of a trigger condition.

13. The method of claim 12 wherein the trigger condition comprises at least one of: unknown upstream or downstream traffic hits on a non-active node that match the subscriber route for the active node, a received message by the non-active node that matches the subscriber route for the active node, or a system notification to activate a route for the active node.

14. A system for balancing load among subscribers accessing the Internet through a cluster of gateway devices, comprising:
a monitor monitoring subscriber states comprising usage of each gateway device of the cluster of gateway devices based on one or more parameters;
a hardware-based central management component deployed in the cluster to determine a load on the each gateway device to detect an overload condition, and performing, in the event of an overload condition on a first gateway device and by a central management component in the cluster, a sharding operation to move at least some access load from the gateway device to a second gateway device having spare access capacity, the hardware-based central management component further performing a discover, offer, request, acknowledgement (DORA) process to determine the state of each subscriber of the subscribers, activating a node upon completion of the DORA process as an active node, and advertising subscriber information of the active node to all non-active nodes in the cluster.

15. The system of claim 14 wherein the each gateway device comprises a consolidated broadband network gateway (CNBG) deployed for use by a broadband service provider (BSP).

16. The system of claim 15 wherein the one or more parameters comprise at least one of: number of gateway devices in the cluster, liveliness of the each gateway device, defined load balancing policies, signal quality to the each gateway device, and bandwidth of a connected link to a gateway device.

17. The system of claim 16 wherein the sharding operation comprises a horizontal sharding operation effectively separating a group of gateway devices into smaller and more numerous gateway devices, and further wherein the sharding operation reassigns one or more subscribers from the first gateway device to the second gateway device.

18. The system of claim 17 wherein the hardware-based management component further determines if the sharding operation relieved the overload condition on the first gateway device, and if not, performs a re-sharding operation to move at least some additional access load from the first gateway device to the second gateway device or a third gateway device.

* * * * *